Feb. 10, 1970  WOO F. CHOW  3,495,094
ALL-MAGNETIC PARAMETRON INTERFACE CIRCUIT
Filed Dec. 22, 1965

INVENTOR
WOO F. CHOW
BY
ATTORNEY

# United States Patent Office 3,495,094
Patented Feb. 10, 1970

3,495,094
ALL-MAGNETIC PARAMETRON INTERFACE CIRCUIT
Woo F. Chow, Horsham, Pa., assignor to Sperry Rand Corporation, New York, N.Y., a corporation of Delaware
Filed Dec. 22, 1965, Ser. No. 515,792
Int. Cl. H03k *19/162*
U.S. Cl. 307—88                    2 Claims

ABSTRACT OF THE DISCLOSURE

A parametron system is disclosed wherein the output signal from a selectively excited parametron circuit is summed with the output from a reference parametron and the resulting signal is applied to a nonlinear device such as a neon tube indicator so as to cause the indicator to ignite when the signals so summed have similar phases.

---

This invention relates to an improvement in signal translating devices, such as electric digital computing devices comprising parametrically excited resonators. More particularly, the invention relates to an improvement for translating an output of such a resonator by converting one of its two steady states into signals of another type, such as an optical or electrical pulse.

An oscillation can be produced in a resonance circuit by varying the resonance frequency of the resonance circuit abruptly with an exciting wave having a frequency about twice that of the resonance frequency of the resonance circuit. This phenomenon is called "parametric excitation of oscillation," and such resonance circuit is called a "parametrically excited resonator." Hereinafter, the parametrically excited resonators will be called "parametrons." The oscillation phase of a parametron can be either one of two phases which are different by 180°; for example, 0 radian and $\pi$ radian. Accordingly, when a weak alternating current having a frequency equal to the oscillation frequency of the parametron is applied to the resonance circuit of the parametron at the same time as, or slightly prior to, the application of the exciting alternating wave, the oscillation phase of the parametron is controlled to either one of 0 radian or one of $\pi$ radian, according to the phase of said weak alternating current.

Thus, an output stage of a parametron circuit indicates its state by one of the two phases which are different by 180°: For example, the phase 0 radian indicates one binary state, such as a 0, and the phase $\pi$ radian indicates the other binary state, such as 1.

It is, at times, desirable to optically indicate the presence of one only of the two phases.

On occasion, it is desirable to convert the phase of one of the two states, such as a 1, into a pulse output, and to convert the phase indicative of the other state, a 0, into a null output.

In accordance with this invention, the output stage of a parametron circuit, and a reference parametron (which is excited by the same exciting wave as the output stage of the parametron circuit and which oscillates at a reference phase such as $\pi$ radian), are inductively coupled to a translating network in a serial manner. The network is suitably biased. An output signal is provided by a nonlinear means which is serially coupled to the network.

In one embodiment of the invention, the network comprises a serial circuit, forming a closed loop, including a D.C. bias source, inductive means coupled to the reference parametron, inductive means coupled to the output stage of the parametron circuit, and a neon lamp, whereby the neon lamp lights when the output stage is in phase with the reference parametron.

In another embodiment of this invention, the network comprises a serial circuit, coupled at one end to a point of reference potential and providing at the other end a pulse output terminal, including inductive means coupled to the reference parametron, inductive means coupled to the output stage of the parametron circuit, inductive means coupled to the pump frequency source which excites the parametrons, a bilateral nonlinear element, and a low pass filter, thereby providing a pulse output when the output stage is in phase with the reference parametron, and providing no output when the output stage is 180° out of phase with the reference parametron.

Other objects and advantages of this invention, together with its construction and mode of operation, will become more apparent from the following description, when read in conjunction with the accompanying drawing, in which.

Figure 1:
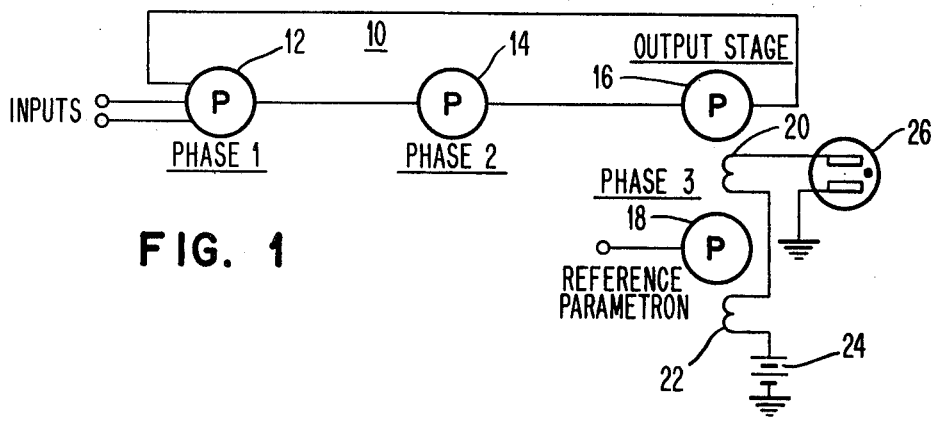
FIG. 1 is a schematic diagram of one embodiment of this invention.

Referring to FIG. 1, there is shown a parametron register 10 consisting of parametrons 12, 14, and 16, coupled together in a closed loop. The parametrons 12, 14, and 16, are excited by separate phases of a clocked exciting wave in known manner. Each of the parametrons 12, 14, and 16 is excited slightly more than a third of a duty cycle, whereby the duty cycles overlap. The parametron 12 is excited during phase 1. Prior to the termination of phase 1, phase 2 is applied to the parametron 14. At the end of phase 2, phase 3 is applied to the output parametron stage 16. The termination of phase 3 occurs at the initiation of the phase 1 (with overlap), so that recirculation of a signal stored in the parametron register 10, from the parametrons stages 12, 14, and 16 and back again to the parametron stage 12, occurs. Input signals can be applied to the parametron 12 of the parametron register 10 in known manner.

A reference parametron 18 is excited by the same pump source as is applied to the output stage 16 of the parametron register 10, namely, phase 3. The reference parametron 18 is adapted to oscillate at a reference phase $\pi$ to provide a reference "1." The output stage 16 is coupled inductively to a winding 20. The reference parametron 18 is inductively coupled to a winding 22. The windings 20 and 22 are serially coupled to a battery or D.C. source 24 in a closed loop with a neon lamp 26.

The neon lamp 26 acts as a display means, thereby indicating the content of the register 10. The neon lamp 26 is prebiased to near its threshold voltage. The output stage of the register 10, the clocked phase 3 parametron 16, is coupled with the output of the reference parametron 18 which oscillates at the same clock phase. The reference parametron 18 has an output phase representing "1." Thus, when the register 10 content is "1," these two outputs 16, 18 add together and the neon lamp 26 fires. However, when the register 10 content is "0," these two outputs 16, 18 cancel each other and the neon lamp 26 does not fire.

Figure 2:
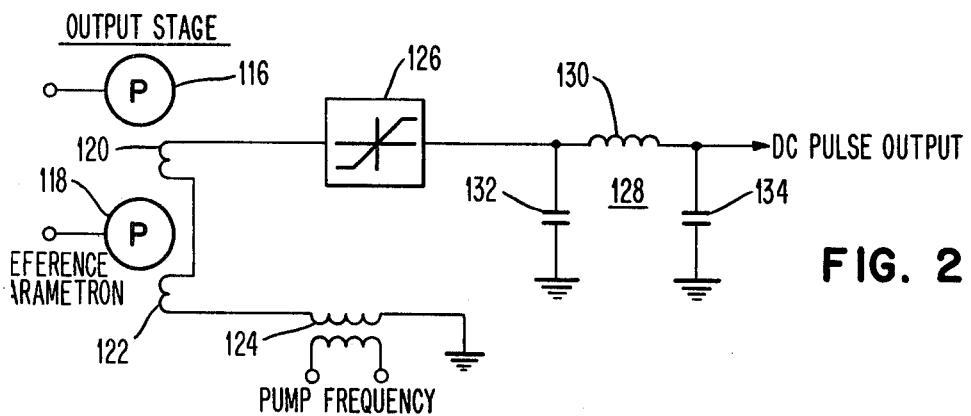
FIG. 2 is a schematic diagram of another embodiment of this invention.

FIG. 2 illustrates circuitry for converting one phase condition of an output stage 116 of a parametron register, or the like, into a pulse output. For example, a pulse represents a "1," and no pulse otherwise.

The output stage 116 of a parametron circuit, such as a parametron register, is inductively coupled to a first winding 120. A reference parametron 118, which is excited by the same pump source in the same phase as the output stage 116, is inductively coupled to a second winding 122. A third winding 124 is excited continuously, or at the same clock phase, by the pump signal (exciting alternating current wave) which is applied to the output stage 116 and the reference parametron 118. The windings 120, 122, 124 are serially coupled, one end of the windings being coupled to a point of reference potential, such as ground. The other end of the serially coupled windings is coupled through a bilateral nonlinear element (such as a nonlinear resistor called thryrite or varistor) 126 to a low pass filter 128, which, for example, can include a serial inductor 130 with shunting capacitors 132 and 134 at each end thereof coupled to a point of reference potential, such as ground. The output of the low pass filter 128 provides a D.C. pulse output when the output stage 116 is in phase with the reference parametron 118, and no pulse at other times. The various waveforms for the output stage 116, reference parametron 118, and pump frequency are illustrated in FIGS. 3a, 3b, 3c, the resultant waveform being illustrated in FIG. 3d. The waveform of FIG. 3d, upon passage through the bilateral nonlinear element 126 and low pass filter 128, appears as illustrated in FIG. 3e, a pulse when the output stage 116 is in phase with the reference parametron 118.

Figure 3:
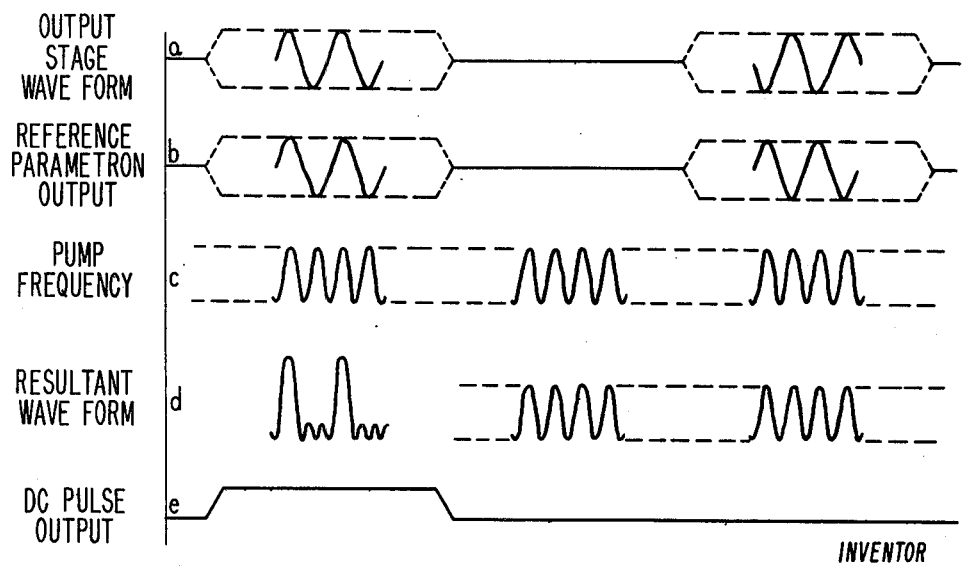
FIG. 3 is a set of waveforms helpful for understanding the embodiment illustrated in FIG. 2.

The principal purpose of the output interface circuit described in connection with FIGS. 2 and 3 is to convert the parametron signal to a pulse signal without the use of a conventional diode. This is done by connecting the output from the stage 116 in series with the output of the reference parametron 118 having an output representing "1" as shown in FIG. 3b. A component of pump frequency is added to the outputs as illustrated in FIG. 3c. The resultant, FIG. 3d, is an asymmetrical signal waveform having high peaks in one polarity. This asymmetrical voltage is applied to the bilateral non-linear element 126, causing a D.C. voltage to be obtained at the output during this period, as shown in FIG. 3e. The low pass filter 128 removes the R.F. component. The continued presence of the pump frequency does not produce any D.C. component, and, thus, does not appear at the output.

When it is desired to obtain bi-polarity outputs, for instance, a positive D.C. pulse for a "1" and a negative D.C. pulse for a "0," the reference parametron can be omitted. The resultant waveform has positive or negative peak pulses depending upon whether the information is "1" or "0." After passing through the bilateral non-linear element and low pass filter, a "1" is defined by a positive D.C. pulse and a "0" is defined by a negative D.C. pulse.

Minor modifications will suggest themselves to those ordinarily skilled in the art. It is desired that this invention be construed broadly and that it be limited solely by the scope of the allowed claims.

The embodiments of the invention in which an exclusive property or privilege is claimed are defined as follows:

1. In combination, an alternating current source adapted to oscillate at a frequency $f$ and at a reference phase $\pi$; a signal source adapted to oscillate at said frequency $f$ and selectively at said phase $\pi$ or at phase 0; an exciting current source adapted to oscillate at the frequency $2f$; a summing means coupling the outputs from said alternating current source, said signal source and said exciting current source in a series; an output terminal; and a bilateral impedance means and a low pass filter serially coupling said summing means to said output terminal.

2. The combination of claim 1 wherein said alternating current source and said signal source are parametrons.

References Cited

UNITED STATES PATENTS

| 2,851,667 | 9/1958 | Crooks | 340—174 |
| 2,856,584 | 10/1958 | Stratton | 340—174 X |
| 2,996,628 | 8/1961 | Holz | 307—88 |
| 3,290,513 | 12/1966 | Sweeney | 307—88 |
| 3,069,632 | 12/1962 | Sterzer | 307—88 |
| 3,108,195 | 10/1963 | Peig Feng Wu | 307—88 |

BERNARD KONICK, Primary Examiner

STEVEN B. POKOTILOUW, Assistant Examiner